Mar. 20, 1923.

T. F. BOWER

DRIVE SHAFT

Filed May 8, 1922

1,449,142

T.F. Bower
INVENTOR

BY /s/ Chapman
ATTORNEY

Patented Mar. 20, 1923.

1,449,142

UNITED STATES PATENT OFFICE.

THOMAS F. BOWER, OF FARMDALE, OHIO.

DRIVE SHAFT.

Application filed May 8, 1922. Serial No. 559,409.

*To all whom it may concern:*

Be it known that I, THOMAS F. BOWER, citizen of the United States of America, residing at Farmdale, in the county of Trumbull and State of Ohio, have invented certain new and useful Improvements in Drive Shafts, of which the following is a specification.

This device relates to drive shafts for automobiles, and particularly to a shaft provided with a spring cushion.

Another object is to provide a drive shaft composed of two members wherein the two inner ends are telescoped in order to form an entire drive shaft.

Another object is to provide a coil spring securely attached at its outer end to the two parts of the shaft members above described.

A still further object is to provide a locking means for securely fastening the two members above described so that the same cannot rotate when the driving shaft rotates in an opposite direction from which the coil spring above referred to is wound.

Machines which are not equipped with some sort of cushioning device must subject the engine and rear transmission to severe strain, for a ton or more of dead weight must be moved when the clutch is thrown in. By means of my invention the backlash, jerks and terrific force exerted upon the transmission and the whole rear axle assembly is practically eliminated.

With these and other objects in view this invention consists of certain novel combinations, constructions, and arrangements of parts, which will be hereinafter fully described and claimed.

Figure 1:
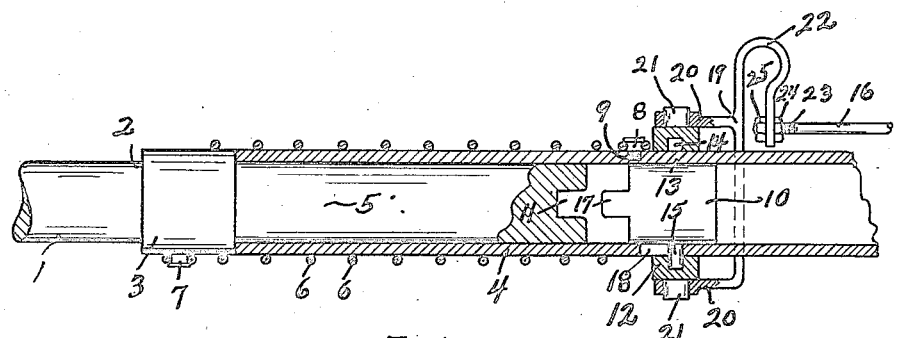
Figure 1 is a side elevation of the improved cushion drive shaft, with parts cut away.
Figure 2:
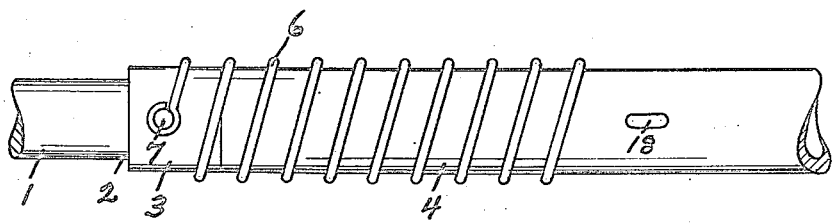
Figure 2 is a side elevation of the device as shown in Figure 1, excepting the locking means for preventing independent movement of the two parts forming the drive shaft.

By referring to the drawings it will be seen that 1 represents the rear part of the drive shaft. Mounted securely upon the inner end 2 is a collar 3. The second part 4 of the drive shaft is hollow in form and telescopes over the end 5, which extends inwardly beyond the collar 3. This second part 4 of the drive shaft is free to rotate on the end 5, except for the action of the coil spring 6, which is attached to a lug 7 extending outwardly from the collar 3, and to a lug 8 secured to the second part 4 of the drive shaft at point 9, when the locking member 10 is out of engagement with the notch 11 formed in the extreme end 5.

By referring to Figure 1 it will be seen that I have provided a slidably maintained collar 12 positioned on the second part 4 of the shaft at point 13. This slidably maintained collar 12 is provided with an internal circumferential groove 14. The locking member 10 situated within the second part 4 of the drive shaft is provided with a pin 15 which travels back and forth in the internal circumferential groove 14 of the collar 12. When it is desired to reverse the engine as is done in backing up, or in any way so that the drive shaft is reversed, I have provided a rod 16 which may be connected in any desirable manner to a reverse pedal so that when the operator wishes to reverse the rotation of the drive shaft, this action on his part causes the collar 12 to carry the locking member 10 into engagement with the slot 11 so that the lug 17 is forced into the slot 11 in making the engagement. The pin 15 slides in the slot 18 formed in the circumferential wall of the second part 4 of the drive shaft. In order to make the contact above described smoothly I have provided a coupler 19 provided with arms 20 which are secured to pins 21 oppositely placed upon the circumference of the slidably maintained collar 12, and also provided with a U-shaped spring 22 which connects to the end 23 of the rod 16 by means of nuts 24 and 25, threaded to the end 23 of the rod 16.

What I claim is:

In a device of the class described, a drive shaft comprising two parts, a collar rigidly secured to one part, a hollow secondary part telescoping the end of the primary part extending beyond said collar, a lug secured to said collar, a lug secured to said hollow secondary part, a coil spring positioned about said secondary part, and collar, the ends of which are secured to the above mentioned lugs, a locking means slidably maintained within the interior of the hollow secondary part of the drive shaft, a slidably maintained collar positioned upon the outer circumference of said hollow secondary part, a pin secured to said locking means, a slotted opening in the hollow secondary part in which the pin above referred to may slide, an internal circumferential groove formed in said slidably maintained collar, a coupler attached to said slidably maintained collar, a U-shaped spring extending from said coupler, an actuating rod for the purpose of throwing the locking means into engagement with a slot in the extreme end of the primary part of the drive shaft, substantially as described for the purpose set forth.

In testimony whereof I affix my signature.

THOMAS F. BOWER.

Witnesses:
C. A. HARPMAN,
GEO. E. DENNISON.